United States Patent
Idicheria et al.

(10) Patent No.: US 9,926,825 B2
(45) Date of Patent: Mar. 27, 2018

(54) METHOD AND APPARATUS FOR EXHAUST PURIFICATION FOR AN INTERNAL COMBUSTION ENGINE

(71) Applicant: GM GLOBAL TECHNOLOGY OPERATIONS LLC, Detroit, MI (US)

(72) Inventors: Cherian A. Idicheria, Novi, MI (US); Kushal Narayanaswamy, Troy, MI (US); Paul M. Najt, Bloomfield Hills, MI (US); Gerald A. Szekely, Jr., Sterling Heights, MI (US); Joel G. Toner, Bad Axe, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/132,601

(22) Filed: Apr. 19, 2016

(65) Prior Publication Data

US 2017/0298800 A1    Oct. 19, 2017

(51) Int. Cl.
*F01N 3/00* (2006.01)
*F01N 9/00* (2006.01)
*F01N 3/20* (2006.01)

(52) U.S. Cl.
CPC .............. *F01N 9/00* (2013.01); *F01N 3/2066* (2013.01); *F01N 2240/28* (2013.01); *F01N 2610/02* (2013.01)

(58) Field of Classification Search
USPC ......... 60/274, 275, 286, 295, 297, 301, 303; 422/182, 183, 186.03, 186.04, 186.16, 422/186.21
See application file for complete search history.

(56) References Cited

U.S. PATENT DOCUMENTS

| | | | | |
|---|---|---|---|---|
| 6,363,716 B1* | 4/2002 | Balko | ............... | B01D 53/9431 422/183 |
| 7,093,429 B1* | 8/2006 | Cho | ..................... | B01D 53/323 60/275 |
| 7,475,533 B2* | 1/2009 | Hirata | ............... | B01D 53/9431 60/274 |
| 8,966,881 B2* | 3/2015 | Nagasawa | ............... | B03C 3/363 60/274 |
| 9,504,961 B2* | 11/2016 | Tsumagari | ......... | B01D 53/9431 |
| 2002/0054844 A1 | 5/2002 | Pfeifer et al. | | |
| 2004/0093853 A1* | 5/2004 | Hemingway | .......... | B01D 53/32 60/275 |
| 2005/0126159 A1 | 6/2005 | Cho et al. | | |
| 2006/0288689 A1* | 12/2006 | Shimoda | ................. | F01N 3/033 60/275 |

(Continued)

*Primary Examiner* — Binh Q Tran
(74) *Attorney, Agent, or Firm* — Quinn IP Law

(57) ABSTRACT

An exhaust aftertreatment system for purifying an exhaust gas feedstream expelled from an internal combustion engine that is operable at an air/fuel ratio that is lean of stoichiometry is described. The exhaust aftertreatment system includes a plasma reactor disposed upstream of a selective catalytic reactor device. The plasma reactor is electrically connected to a plasma controller. The plasma controller controls the plasma reactor to generate ozone from constituents of the exhaust gas feedstream, and the ozone reacts to oxidize nitrogen oxide contained in the exhaust gas feedstream to form nitrogen dioxide. The nitrogen dioxide reacts with a reductant in the selective catalytic reactor device to form elemental nitrogen and water.

19 Claims, 3 Drawing Sheets

(56) References Cited

U.S. PATENT DOCUMENTS

2010/0275586 A1\* 11/2010 Hirata ............... B01D 53/9409
60/299
2015/0000253 A1  1/2015 Kim et al.

\* cited by examiner

METHOD AND APPARATUS FOR EXHAUST PURIFICATION FOR AN INTERNAL COMBUSTION ENGINE

TECHNICAL FIELD

This disclosure relates to purification of an exhaust gas feedstream for an internal combustion engine, and control related thereto.

BACKGROUND

Internal combustion engines introduce an air/fuel mixture into each cylinder that is compressed during a compression stroke and ignited by either the compression (compression-ignition) or by a spark plug (spark-ignition). Spark-ignition (SI) engines may operate in different combustion modes, including, by way of non-limiting examples, a homogeneous SI combustion mode and a stratified-charge SI combustion mode. SI engines may also be configured to operate in a homogeneous-charge compression-ignition (HCCI) combustion mode, also referred to as controlled auto-ignition combustion.

An engine in-cylinder air/fuel mixture may be characterized in terms of an air/fuel ratio, which may be described as stoichiometric, lean, or rich. Compression-ignition engines and spark-ignition engines may be configured to operate at lean air/fuel ratio conditions. Engine exhaust gases associated with lean air/fuel ratio operation may have relatively higher quantities of nitrogen oxides, including, e.g., nitric oxide (NO) and nitrogen dioxide (NO2), as compared to an internal combustion engine operating at stoichiometry.

SUMMARY

An exhaust aftertreatment system for purifying an exhaust gas feedstream expelled from an internal combustion engine that is operable at an air/fuel ratio that is lean of stoichiometry is described. The exhaust aftertreatment system includes a plasma reactor disposed upstream of a selective catalytic reactor device. The plasma reactor is electrically connected to a plasma controller. The plasma controller controls the plasma reactor to generate ozone from constituents of the exhaust gas feedstream, and the ozone reacts to oxidize nitrogen oxide contained in the exhaust gas feedstream to form nitrogen dioxide. The nitrogen dioxide reacts with a reductant in the selective catalytic reactor device to form elemental nitrogen and water.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

The concepts described herein are related to embodiments of an exhaust aftertreatment system that may be fluidly coupled to an exhaust outlet of an internal combustion engine, wherein the internal combustion engine is capable of operating at a lean air/fuel ratio. The exhaust aftertreatment system may be employed to purify an exhaust gas feedstream that is expelled from the internal combustion engine, and includes a plasma reactor disposed upstream of a selective catalytic reactor device, preferably in conjunction with other exhaust purification devices. The plasma reactor is electrically connected to a plasma controller, and is controlled to generate ozone from constituents of the exhaust gas feedstream. The ozone reacts, in the plasma reactor, to oxidize nitrogen oxide (NO) contained in the exhaust gas feedstream to form nitrogen dioxide (NO2), and the NO2 reacts in the selective catalytic reactor device with a reductant to form elemental nitrogen (N2) and water (H2O).

Figure 1:
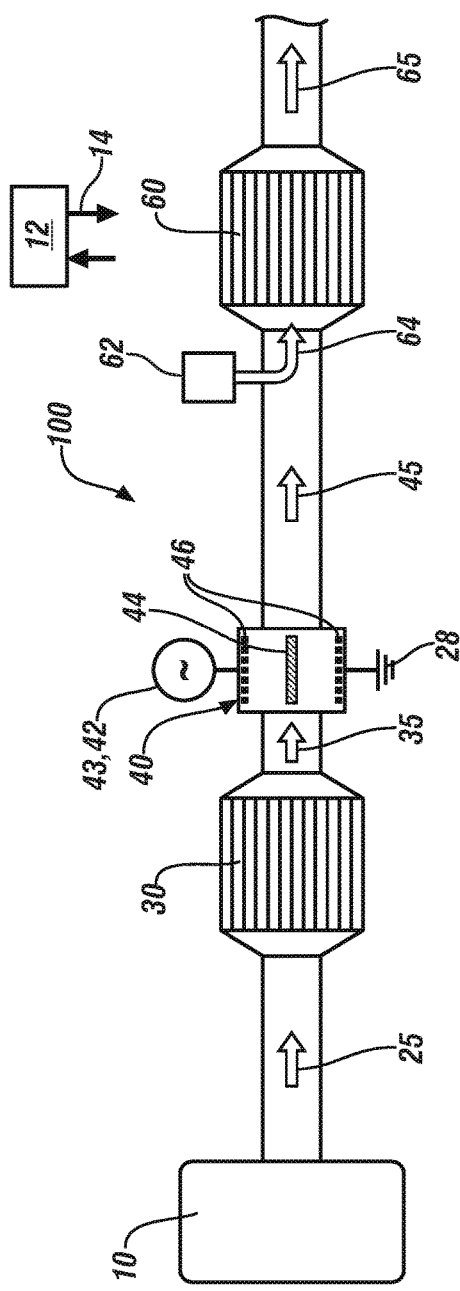
FIG. 1 schematically illustrates an embodiment of an internal combustion engine and exhaust aftertreatment system that includes a plasma reactor disposed upstream to a selective catalytic reactor device, wherein the plasma reactor includes a volumetric dielectric barrier-discharge plasma reactor, in accordance with the disclosure.

Referring now to the drawings, wherein the depictions are for the purpose of illustrating certain exemplary embodiments only and not for the purpose of limiting the same, FIG. 1 schematically illustrates an embodiment of an internal combustion engine 10 and an exhaust aftertreatment system 100 that includes a first catalytic reactor 30, a plasma reactor 40, and a selective catalytic reactor (SCR) 60 disposed downstream of the plasma reactor 40, as shown. The plasma reactor 40 in this embodiment is configured as a volumetric dielectric barrier-discharge plasma reactor, an embodiment of which is described in detail with reference to FIG. 2. The exhaust aftertreatment system 100 shown with reference to FIG. 1 depicts one embodiment of an exhaust aftertreatment system that entrains exhaust gases that are byproducts of combustion and provides a passageway for an exhaust gas feedstream through one or a plurality of exhaust purification elements, with the feedstream finally being expelled into the atmosphere after being subjected to purification processes that may include oxidation, reduction, storage and filtering. The concepts described herein may apply to a plurality of embodiments of exhaust aftertreatment systems that include a plasma reactor disposed upstream of an SCR. Furthermore, various embodiments of the exhaust aftertreatment system described herein may be advantageously applied to any internal combustion engine that is configured to operate at lean air/fuel ratios, including e.g., a compression-ignition engine or a lean-burn spark-ignition engine. As employed herein, the term "upstream" and related terms refer to elements that are towards an origination of a flow stream relative to an indicated location, and the term "downstream" and related terms refer to elements that are away from an origination of a flow stream relative to an indicated location.

The exhaust gas entrained by and flowing through the exhaust aftertreatment system 100 is referred to herein as an exhaust gas feedstream. The composition and physical and chemical characteristics of the exhaust gas feedstream may change as the exhaust gas feedstream passes through various elements of the exhaust aftertreatment system 100, e.g., the plasma reactor 40, the first catalytic reactor 30 and the SCR 60. As such, the exhaust gases output from the various elements of the exhaust aftertreatment system 100 are referred to herein as effluents, each which may have different composition and physical and chemical characteristics as the exhaust gas feedstream progresses through the elements of the exhaust aftertreatment system 100.

The engine 10 may be configured to operate in a four-stroke combustion cycle that includes repetitively executed intake, compression, expansion and exhaust strokes, wherein the strokes are associated with translations of pistons within cylinder bores. Operation of the engine 10 is controlled by a controller (ECM) 12, which communicates via various communication lines 14 with various sensors and various actuators to monitor and control operation of the engine 10 to generate mechanical power. The ECM 12 communicates with a plasma discharge controller 42 to control operation of an AC electric power source 43 to supply electric power to the plasma reactor 40. The plasma reactor 40 in this embodiment is configured as a volumetric dielectric barrier-discharge plasma reactor that includes an electrode 44 that is disposed in portions of the exhaust aftertreatment system 100, and operates as described herein. As used herein, the term "groundless" indicates absence of a discrete element or structure proximal to the electrode 44 that would be capable of electrically coupling to an electrical ground path.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be periodically executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired link, a networked communication bus link, a wireless link or another suitable communications link. Communication includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers.

The first catalytic reactor 30 is disposed to receive a first effluent 25 that is output from the internal combustion engine 10. The first catalytic reactor 30 may be any suitable catalytic device, preferably in the form of a washcoated substrate, which may be applied in an aftertreatment system for an internal combustion engine that is capable of three-way catalysis, i.e., HC and CO oxidation and NOx reduction, under various operating conditions. The first catalytic reactor 30 may also be capable of NOx storage under certain operating conditions related to temperature and air/fuel ratio. The first catalytic reactor 30 may also employ a filtering substrate that is capable of filtering particulate matter out of the exhaust gas feedstream under certain operating conditions. One skilled in the art is able to design and develop an embodiment of the first catalytic reactor 30 for an embodiment of the engine 10.

The plasma reactor 40 is disposed downstream of the first catalytic reactor 30, and may be located in an underfloor location when the engine 10 and the exhaust aftertreatment system 100 are disposed on a vehicle. The plasma reactor 40 is disposed to receive a second effluent 35 that is output from the first catalytic reactor 30. The plasma reactor 40 includes an electrode 44 that is electrically connected to the AC electric power source 43, and a dielectric barrier 46 that is disposed between the electrode 44 and the electrical ground 28.

The SCR 60 is disposed to receive a third effluent 45 that is output from the plasma reactor 40. The SCR 60 includes selected materials that are capable of reducing NOx molecules to elemental nitrogen in the presence of a reductant, e.g., urea or ammonia. A reductant injection device 62 is disposed to inject a reductant 64 in the exhaust gas feedstream upstream of the SCR 60. SCRs and reductant injection devices and details related to their implementation and operation are known to those skilled in the art.

In operation, the first effluent 25 that is output from the internal combustion engine 10 may contain unburned hydrocarbons (HC), carbon monoxide (CO), oxides of nitrogen (NOx) and particulate matter, all of which may be subjected to oxidation, reduction, storage and/or filtering, depending upon the capability and configuration of the first catalytic reactor 30 and operating conditions such as temperature and flowrates. The second effluent 35 that is output from the first catalytic reactor 30 is subjected to low-temperature plasma streamers that are generated by the plasma reactor 40, and passes as the third effluent 45 into the SCR 60, which is capable of reducing NOx molecules to elemental nitrogen in the presence of a reductant, e.g., urea or ammonia. A fourth effluent 65 is expelled from the SCR 60 into the atmosphere after treatment therein. Alternatively, or in addition, the internal combustion engine 10 may operate at an air/fuel ratio that generates ammonia in the first catalytic reactor 30 when it is configured as a three-way catalyst, and the ammonia is able to function as a reductant in the SCR 60, referred to as a passive method for NOx reduction.

Figure 2:
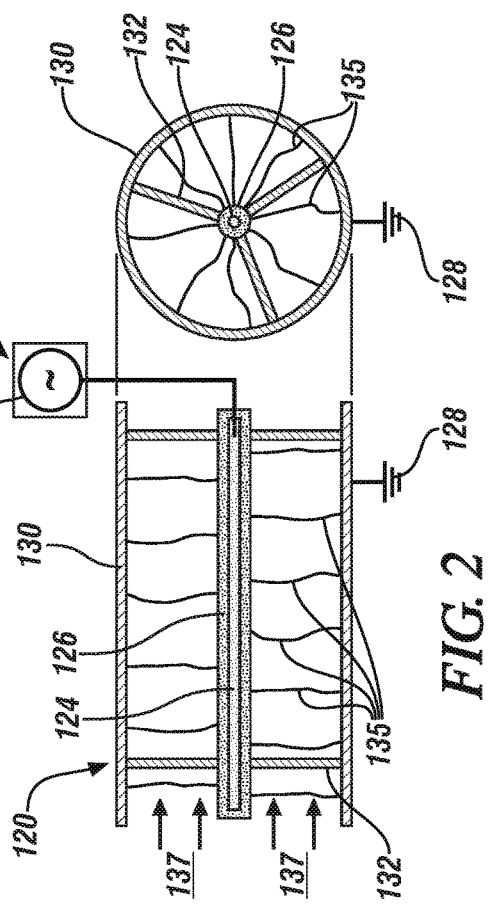
FIG. 2 schematically illustrates an embodiment of a volumetric dielectric barrier-discharge plasma reactor for an exhaust aftertreatment system, in accordance with the disclosure.

FIG. 2 schematically shows a cross-sectional side-view and a corresponding end-view of an embodiment of a plasma reactor 120 that may be employed in an embodiment of the exhaust aftertreatment system 100 described with reference to FIG. 1. By way of a non-limiting example, the plasma reactor 120 may be employed as the volumetric dielectric barrier-discharge plasma reactor 40 for the exhaust aftertreatment system 100 described with reference to FIG. 1. The plasma reactor 120 includes a tubular-shaped outer shell 130 that is fabricated from ferric steel or another electrically conductive material. The outer shell 130 is preferably designed with sufficient structural integrity for use in an exhaust system that may be deployed on a vehicle. The outer shell 130 is preferably electrically connected to an electrical ground 128. An electrode 124 is disposed within the outer shell 130, preferably co-axial with a longitudinal axis of the outer shell 130. The electrode 124 is fabricated from ferric steel or another electrically conductive material, and is encased in a dielectric coating 126 that serves as an electrical barrier. One end of the electrode 124 is electrically connected to an AC electric power source 123, and the AC electric power source is controlled by a plasma discharge controller 122. The plasma discharge controller 122 preferably communicates with a controller, e.g., the ECM 12 described with reference to FIG. 1, from which it receives operating commands. The electrode 124 may be structurally supported within the outer shell 130 with a plurality of non-conductive support beams 132 or other suitable structural elements. Operation of the plasma reactor 120 is shown, including a plurality of streamers 135 and a direction of flow of the exhaust gas feedstream, as indicated by arrows 137.

In one embodiment, the dielectric coating 126 has a thickness that is between 1 mm and 5 mm. The dielectric coating 126 provides a dielectric barrier around the electrode 124, which is fully encapsulated thereby. The material of the dielectric coating 126 may be any suitable dielectric material capable of withstanding the temperatures and pressures that can occur in an exhaust gas feedstream. For example, the dielectric material may be a glass, quartz, or ceramic dielectric material, such as a high purity alumina.

The plasma discharge controller 122 controls operation of the plasma reactor 120, employing electric power supplied from an AC electric power source 123. The plasma discharge controller 122 also electrically connects to the electrical ground path 128. The AC electric power source 123 electrically connects to the electrode 124, preferably via an electrical cable, a single one of which is shown. The plasma discharge controller 122 includes control circuitry that controls the AC electric power source 123 to generate a high-frequency, high-voltage electrical pulse that is supplied to the electrode 124 to generate a plasma discharge event in response to control signals that may originate from the ECM 12. A current sensor may be disposed to monitor the electric cable to detect electrical current that is supplied from the plasma discharge controller 122 to the electrode 124 for purposes of monitoring and diagnostics. The current sensor may employ direct or indirect current sensing technologies in conjunction with signal processing circuits and algorithms to determine a parameter that is associated with the magnitude of current that is supplied to the electrode 124. Such current sensing technologies may include, by way of non-limiting embodiments, induction, resistive shunt, or Hall effect sensing technologies.

During each plasma discharge event, the plasma discharge controller 122 controls the AC electric power source 123 to generate a high-frequency, high-voltage electrical pulse that is supplied to the electrode 124. In one example, the high-frequency, high-voltage electrical pulse may have a peak primary voltage of 100 V, secondary voltages between 10 and 70 kV, a duration of 2.5 ms, and a total energy of 1.0 J, with a frequency between 60 Hz and 10 MHz. The plasma discharge event generates one or a plurality of plasma discharge streamers 135, as shown with reference to FIG. 2, which originate at the steel shell 130 and propagate through the effluent of the exhaust gas feedstream 137 towards the electrode 124. The plasma discharge streamers 135 are low-temperature plasma streamers that may draw relatively lower currents, e.g., less than 10 mA in one embodiment. The plasma discharge streamers 135 terminate on the electrode 124. The plasma discharge streamers 135 interact with the effluent of the exhaust gas feedstream 137 to form ozone ($O_3$) from oxygen ($O_2$). The specific details of the configuration of the electrode 124, its arrangement in the exhaust gas feedstream 137 within the steel shell 130, and operating parameters (peak voltage, frequency and duration) associated with electric power and timing of activation during each plasma discharge event are application-specific, and are preferably selected to achieve desired characteristics.

Figure 3:
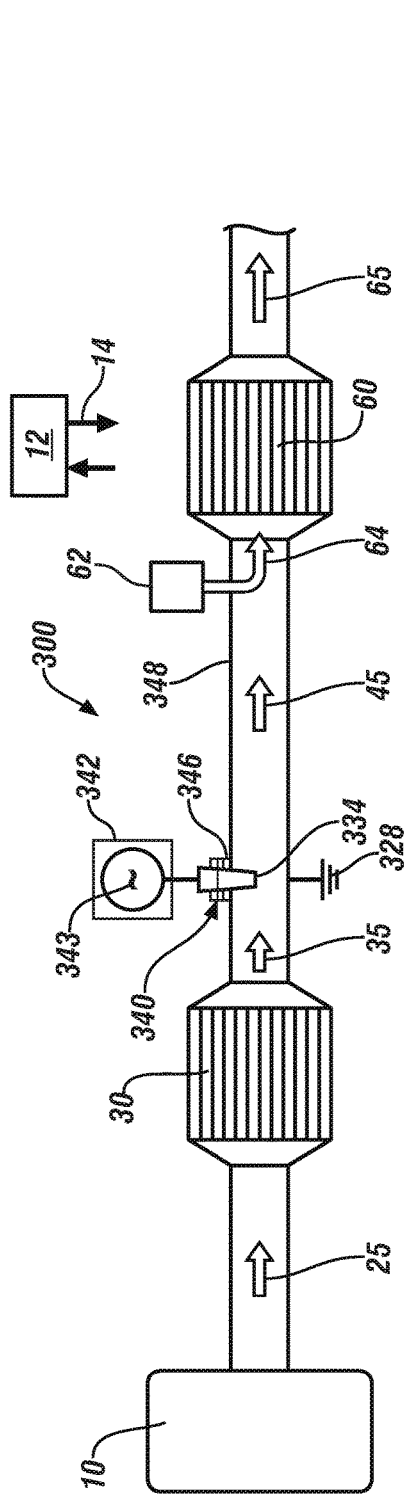
FIG. 3 schematically illustrates another embodiment of an internal combustion engine and exhaust aftertreatment system that includes a plasma reactor disposed upstream to a selective catalytic reactor device, wherein the plasma reactor includes a dielectric barrier-discharge plasma igniter, in accordance with the disclosure.

FIG. 3 schematically illustrates the internal combustion engine 10 and another embodiment of an exhaust aftertreatment system 300 that includes the first catalytic reactor 30, a plasma igniter 340, and the SCR 60 disposed downstream of the plasma igniter 340, as shown. The plasma igniter 340 is preferably configured as a dielectric barrier-discharge plasma reactor, an embodiment of which is described in detail with reference to FIG. 4. A single plasma igniter 340 is shown, but there may be a plurality of the plasma reactors 340 deployed in the exhaust aftertreatment system 300. The exhaust aftertreatment system 300 includes an electrical ground path 328. The exhaust aftertreatment system 300 shown with reference to FIG. 3 is analogous to the exhaust aftertreatment system 100 described with reference to FIG. 1, and entrains exhaust gases that are byproducts of combustion and provides a passageway for an exhaust gas feedstream through one or a plurality of exhaust purification elements, with the feedstream finally being expelled into the atmosphere after being subjected to purification.

Operation of the engine 10 is controlled by the ECM 12, which communicate via various communication lines 14 with various sensors and various actuators to monitor and control operation of the engine 10 to generate mechanical power. The ECM 12 communicates with a plasma discharge controller 342 to control operation of an AC electric power source 343 to supply electric power to the plasma igniter 340. The plasma igniter 340 in this embodiment is configured as a dielectric barrier-discharge plasma reactor that includes electrode 333 that is disposed in portions of the exhaust aftertreatment system 300, and operates as described herein.

Figure 4:
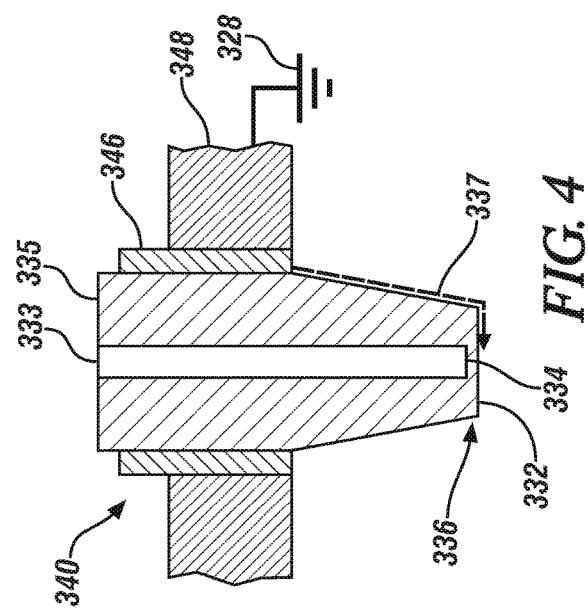
FIG. 4 schematically illustrates an embodiment of a dielectric barrier-discharge plasma reactor for an exhaust aftertreatment system, in accordance with the disclosure.

FIG. 4 schematically shows one embodiment of the dielectric barrier-discharge plasma igniter (plasma igniter) 340. The plasma igniter 340 preferably includes a single electrode 333 encased in a casing 332 formed from dielectric material, wherein the electrode 333 has a tip portion 334 near a second, distal end 336 that is opposite a first end 335 that electrically connects to the plasma discharge controller 342. In certain embodiments, the tip portion 334 of the electrode 333 is embedded in the casing 332 and has a thickness that is within a range between 1 mm and 5 mm. The plasma igniter 340 threadably attaches to a mounting boss 346 that is attached to an exhaust pipe 348 that channels the exhaust gas feedstream between the first catalytic reactor 30 and the SCR 60. The mounting boss 346 preferably threadably inserts through and attaches to an aperture in the exhaust pipe 348 such that the tip portion 334 of the electrode 333 protrudes into the exhaust gas feedstream. The electrode 333 electrically connects to the plasma discharge controller 342. The plasma discharge controller 342 monitors and controls operation of the plasma igniter 340, employing electric power supplied from a power source, e.g., a battery. The plasma discharge controller 342 electrically connects to the electrical ground path 328. The plasma discharge controller 342 is configured to apply a high-frequency, high-voltage electrical pulse to the plasma igniter 340 to generate a plasma discharge event.

The casing 332 provides a dielectric barrier around the electrode 333, preferably such that the length of the electrode 333 extends into an exhaust gas feedstream when the plasma igniter 340 is installed in the exhaust pipe 348. As such, the electrode 333 is fully encapsulated by the dielectric material. The casing 332 may be configured in a frustoconical shape that tapers in a narrowing fashion towards the distal end 336. This example is non-limiting, and the dielectric casing 332 may be otherwise shaped and/or contoured relative to the contour of the distal end 336. The distal end 336 may be shaped, for example, as a conical end, a cylindrical end, a chamfered cylindrical end, etc. Other cross-sectional shapes, e.g., oval, rectangular, hexagonal, etc., may be employed. Other configurations of plasma reactors 340 may be employed with similar effect. The dielectric material may be any suitable dielectric material capable of withstanding the temperatures and pressures of an engine combustion chamber. For example, the dielectric material may be a glass, quartz, or ceramic dielectric material, such as a high purity alumina.

During each plasma discharge event, the plasma discharge controller 342 applies a high frequency voltage to the electrode 333. In one example, the high-frequency, high-voltage electrical pulse may have a peak primary voltage of 100 V, secondary voltages between 10 and 70 kV, a duration of 2.5 ms, and a total energy of 1.0 J, with a frequency near ten megahertz (MHz). The plasma discharge event generates one or a plurality of plasma discharge streamers 337 that originate at the mounting boss 346 and propagate towards the tip portion 334. The plasma discharge streamers 337 may propagate across a surface of a longitudinal portion of the dielectric casing 332 of the electrode 333 in multiple radial locations and terminate on the distal end 336 at or near the tip portion 334. The plasma discharge streamers 337 interact with and ignite elements of the third effluent 45. The specific details of the configuration of the plasma igniter 340, its arrangement in the exhaust pipe 348, and operating parameters (peak voltage, frequency and duration) associated with electric power and timing of activation during each plasma discharge event are application-specific, and are preferably selected to achieve desired magnitude of ozone within the exhaust pipe 348. Alternatively, the plasma igniter 340 may be configured as a dielectric barrier-discharge plasma reactor having a discrete ground element. Alternatively, the plasma igniter 340 may be configured as a discharge plasma reactor having an electrode that is exposed at a tip portion. Discharge plasma reactors are known and not described in detail herein.

Figure 5:
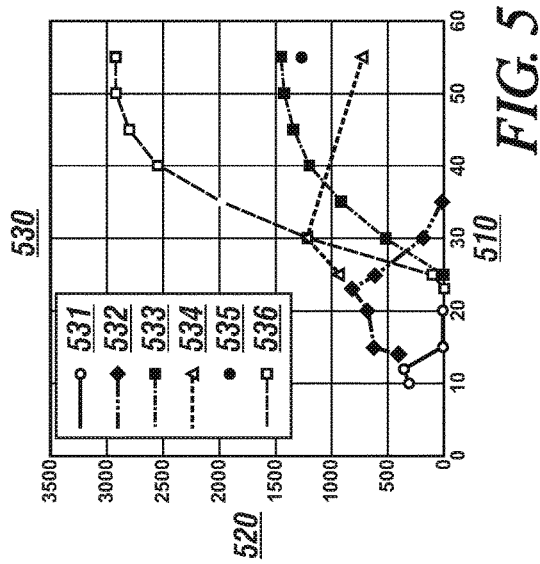
FIG. 5 graphically illustrates a magnitude of ozone yield associated with selected operating states of a plasma reactor for an exhaust aftertreatment system, in accordance with the disclosure.

FIG. 5 graphically shows a magnitude of ozone yield, in terms of a concentration (ppb) 520 on the vertical axis in relation to control parameters for an embodiment of the plasma igniter 340 configured as a dielectric barrier-discharge plasma reactor as described with reference to FIG. 4, wherein the control parameters include a primary voltage level (V) 510 on the horizontal axis and a discharge duration (microseconds) for one or a plurality of discharge events 530. The discharge events 530 are described with reference to Table 1, below.

TABLE 1

| Discharge event | Quantity of discharge events | Discharge duration (μs) |
|---|---|---|
| 531 | 1 | 1000 |
| 532 | 1 | 100 |
| 533 | 1 | 10 |
| 534 | 1 | 20 |
| 535 | 1 | 6 |
| 536 | 2 | 10 |

The results indicate that the ozone yield increases with an increase in the primary voltage supplied to a plasma reactor and an increase in the quantity of discharge events.

Figure 6:
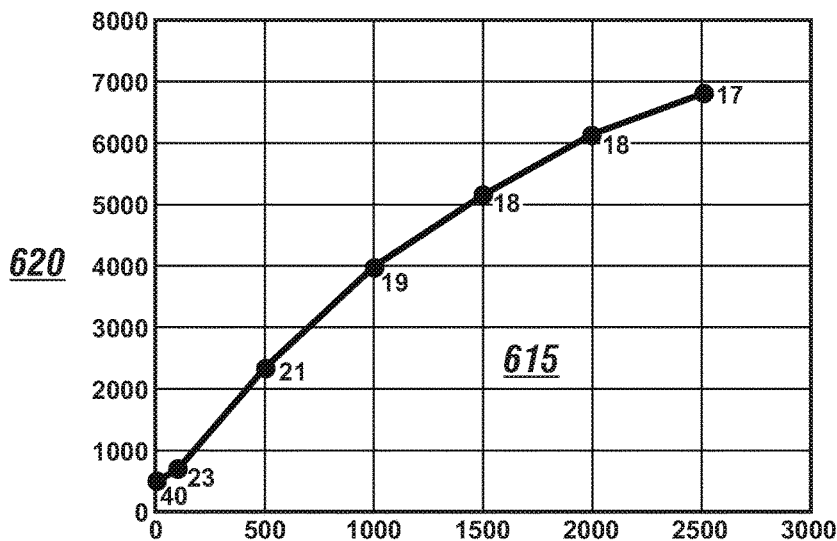
FIGS. 6 and 7 graphically illustrate magnitudes of ozone yield associated with selected operating states of an ignition system plasma reactor for an exhaust aftertreatment system, in accordance with the disclosure.

FIG. 6 graphically shows ozone yield 615, in terms of a concentration (ppb) 620 on the vertical axis in relation to control parameters for an embodiment of the plasma igniter 340 when configured as a first dielectric barrier discharge reactor, wherein the control parameters include a discharge duration (microseconds) 610 on the horizontal axis. These results indicate that there is an increase in the ozone yield with discharge events that include an increased duration, voltage, and/or quantity of events during the discharge.

Figure 7:
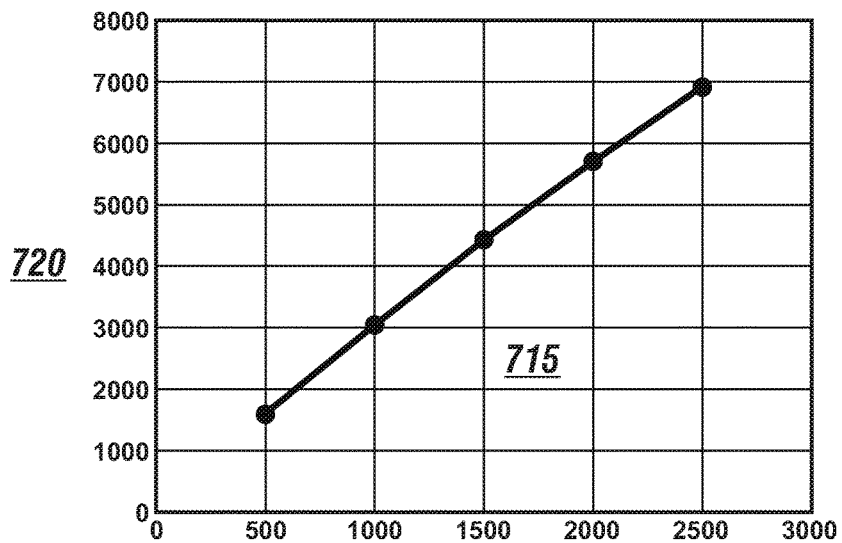

FIG. 7 graphically shows ozone yield 715, in terms of a concentration (ppb) 720 on the vertical axis in relation to control parameters for an embodiment of the plasma igniter 340 when configured as a second dielectric barrier discharge reactor, wherein the control parameters include a quantity of discharge events 710 on the horizontal axis. These results indicate that there is an increase in the ozone yield with discharge events that include an increased duration, voltage, and/or quantity of events during the discharge.

When an embodiment of the plasma reactor is disposed in an exhaust aftertreatment system and contacts effluent gases that are contained in an exhaust gas feedstream from an internal combustion engine that is operating at an air/fuel ratio that is lean of stoichiometry, operation of the plasma reactor may generate ozone (O3) from constituents of the exhaust gas feedstream that include oxygen (O2), which is present under lean engine operation. This reaction occurs under various engine operating conditions, including when the internal combustion engine is operating at a low temperature condition. This process of forming ozone (O3) from oxygen (O2) in the dielectric barrier-discharge plasma reactor may be described as follows:

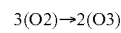

$3(O_2) \rightarrow 2(O_3)$

The various reactions may be described as follows. Ozone (O3) may be formed from oxygen (O2) in the dielectric barrier-discharge plasma reactor by breaking up O2 in the presence of plasma to form O, as follows:

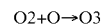

$O_2 + O \rightarrow O_3$

The formed ozone may be used to convert NO to NO2 in a gas-phase reaction, as follows:

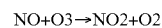

$NO + O_3 \rightarrow NO_2 + O_2$

The presence of NO2, especially at a higher concentration of NO2, e.g., at a ratio of NO2:NO that is equal to 1:1, may facilitate faster SCR reaction rates, as follows. A standard SCR reaction may be described chemically as follows:

$$4NO+4NH3+O2 \rightarrow 4N2+6H2O$$

A slow SCR reaction may be described chemically as follows:

$$2NO2+4NH3+O2 \rightarrow 3N2+6H2O$$

A fast SCR reaction may be facilitated when there is a higher concentration of NO2, e.g., at a ratio of NO2:NO that is equal to 1:1, as follows:

$$NO+NO2+2NH3 \rightarrow 2N2+3H2O$$

As such, an embodiment of the plasma reactor described herein may be disposed in an exhaust gas feedstream upstream of an embodiment of the SCR, as described with reference to FIGS. 1, 2, 3 and 4. The result may include improved lean NOx conversion rates by combining reductant injection in combination with operation of the plasma reactor to increase concentration of NO2 in the exhaust gas feedstream to facilitate fast SCR reactions.

Furthermore, a higher concentration of NO2, e.g., at a ratio of NO2:NO that is equal to 1:1 out of the plasma reactor 40 may facilitate faster reaction rates in the SCR 60. Furthermore, embodiments of the plasma reactor 40 disposed upstream of the SCR 60 may be employed to control a NO:NO2 ratio to less than 0.5 to eliminate or mitigate sulfur poisoning on the SCR 60.

Figure 8:
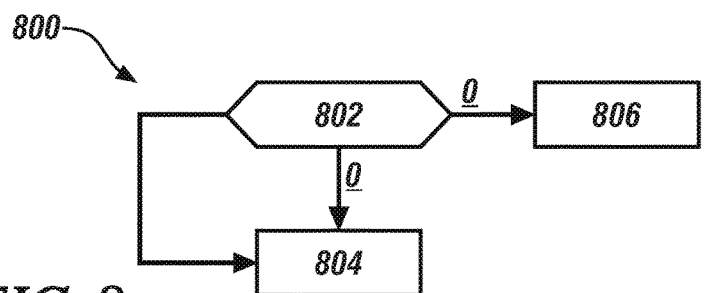
FIG. 8 schematically illustrates, in flowchart form, a method for desulfating a selective catalytic reactor device, in accordance with the disclosure.

FIG. 8 schematically shows a flowchart 800 that may be reduced to an instruction set that is executed in the controller 12, which includes monitoring outputs from the SCR 60 and detecting an increase in a parameter that indicates occurrence of sulfur deposition on the SCR 60 (802). When there is sulfur deposition that is greater than a threshold on the SCR 60 (802)(1), the plasma reactor 40 is triggered to operate in a manner that generates a NO2:NO ratio in the exhaust gas feedstream 37 that is greater than 1:1, which serves to desulfate the SCR 60 (804). This operation continues until the sulfur deposition reduces to less than the threshold. Otherwise (802)(0), normal operation continues (806).

Furthermore, the use of an embodiment of the plasma reactor 40 is not constrained to a close-coupled location. One embodiment of the exhaust aftertreatment system may include a single one of the plasma reactors, e.g., plasma reactor 40, which is located at a position that is distal to the internal combustion engine, e.g., in an underfloor location.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. An exhaust aftertreatment system for purifying an exhaust gas feedstream expelled from an internal combustion engine that is operable at an air/fuel ratio that is lean of stoichiometry, comprising:
    a plasma reactor disposed upstream of a selective catalytic reactor device and a reductant injection device disposed to inject a reductant into the exhaust gas feedstream upstream of the selective catalytic reactor device;
    wherein the plasma reactor is electrically connected to a plasma controller;
    wherein the plasma controller is configured to control the plasma reactor to generate ozone from constituents of the exhaust gas feedstream;
    wherein the plasma reactor is controlled to generate ozone in the exhaust gas feedstream, wherein the ozone reacts to oxidize nitrogen oxide contained in the exhaust gas feedstream to form nitrogen dioxide and nitric oxide at a ratio that is greater than 1:1; and
    wherein the plasma reactor is controlled to desulfate sulfur stored on the selective catalytic reactor device by reacting with the nitrogen dioxide and nitric oxide at the ratio that is greater than 1:1.

2. The exhaust aftertreatment system of claim 1, wherein the plasma reactor comprises a barrier discharge plasma igniter.

3. The exhaust aftertreatment system of claim 1, wherein the plasma reactor comprises a volumetric plasma reactor.

4. The exhaust aftertreatment system of claim 1, wherein the plasma reactor is controllable to generate ozone from constituents of the exhaust gas feedstream when the internal combustion engine is operating at a lean air/fuel ratio and at a low temperature condition.

5. The exhaust aftertreatment system of claim 1, wherein the plasma reactor comprises a volumetric groundless barrier discharge reactor that includes an electrode disposed in the exhaust gas feedstream and electrically connected to an AC electric power source, and a dielectric barrier disposed between the electrode and an outer shell, wherein the outer shell is electrically connected to an electrical ground.

6. The exhaust aftertreatment system of claim 5, wherein the electrode is encapsulated in the dielectric material.

7. The exhaust aftertreatment system of claim 5, wherein the dielectric material is coated on an inner surface of the outer shell.

8. The exhaust aftertreatment system of claim 5, wherein the electrode comprises an elongated solid cylinder fabricated from electrically conductive material and longitudinally disposed in the exhaust gas feedstream within the outer shell.

9. The exhaust aftertreatment system of claim 1, wherein the plasma controller controllably supplies AC electric power to the barrier discharge plasma reactor at a voltage level between 5 and 100 kV and at a frequency between 60 Hz and 10 MHz.

10. A method for purifying an exhaust gas feedstream expelled from an internal combustion engine, wherein the internal combustion engine is fluidly connected to an exhaust aftertreatment system, wherein the exhaust aftertreatment system includes a plasma reactor disposed upstream of a selective catalytic reactor device, the method comprising:
    operating the internal combustion engine at a lean air/fuel ratio;
    controlling the plasma reactor to generate ozone in the exhaust gas feedstream, wherein the ozone reacts with nitrogen oxide contained in the exhaust gas feedstream to form a 1:1 ratio of nitrogen dioxide and nitric oxide; and
    introducing a reductant into the exhaust gas feedstream upstream of the selective catalytic reactor device, wherein the 1:1 ratio of nitrogen dioxide and nitric oxide reacts with the reductant in the selective catalytic reactor device to form elemental nitrogen and water;
    controlling the plasma reactor to generate ozone in the exhaust gas feedstream, wherein the ozone reacts to oxidize nitrogen oxide contained in the exhaust gas feedstream to form nitrogen dioxide and nitric oxide at a ratio that is greater than 1:1; and desulfating sulfur stored on the selective catalytic reactor device by reacting with the nitrogen dioxide and nitric oxide at the ratio that is greater than 1:1.

11. The method of claim 10, wherein controlling the plasma reactor to generate ozone in the exhaust gas feedstream comprises supplying AC electric power to the plasma reactor at a voltage level between 5 and 100 kV and at a frequency between 60 Hz and 10 MHz.

12. The method of claim 10, wherein the exhaust aftertreatment system includes a three-way catalyst upstream relative to the plasma reactor, and wherein introducing a reductant into the exhaust gas feedstream upstream of the selective catalytic reactor device comprises operating to internal combustion engine at an air/fuel ratio that generates ammonia in the three-way catalyst, wherein the ammonia operates as a reductant in the selective catalytic reactor device.

13. The method of claim 10, further comprising introducing a reductant into the exhaust gas feedstream upstream of the selective catalytic reactor device, wherein the nitrogen dioxide and nitric oxide reacts with the reductant in the selective catalytic reactor device to form elemental nitrogen and water.

14. A method for reducing NOx emissions in an exhaust gas feedstream expelled from an internal combustion engine operating at a lean air/fuel ratio, the method comprising:

fluidly connecting the internal combustion engine to an exhaust aftertreatment system, wherein the exhaust aftertreatment system includes a plasma reactor disposed upstream of a selective catalytic reactor device;

controlling the plasma reactor to generate ozone in the exhaust gas feedstream, wherein the ozone reacts with nitrogen oxide contained in the exhaust gas feedstream to form a 1:1 ratio of nitrogen dioxide and nitric oxide; and introducing a reductant into the exhaust gas feedstream upstream of the selective catalytic reactor device, wherein the nitrogen dioxide reacts with the reductant in the selective catalytic reactor device to form elemental nitrogen and water;

controlling the plasma reactor to generate ozone in the exhaust gas feedstream, wherein the ozone reacts to oxidize nitrogen oxide contained in the exhaust gas feedstream to form nitrogen dioxide and nitric oxide at a ratio that is greater than 1:1; and desulfating sulfur stored on the selective catalytic reactor device by reacting with the nitrogen dioxide and nitric oxide at the ratio that is greater than 1:1.

15. The method of claim 14, wherein controlling the plasma reactor to generate ozone in the exhaust gas feedstream comprises supplying AC electric power to the plasma reactor at a voltage level between 5 and 100 kV and at a frequency between 60 Hz and 10 MHz.

16. The method of claim 14, wherein introducing a reductant into the exhaust gas feedstream upstream of the selective catalytic reactor device comprises introducing a urea-based reductant into the exhaust gas feedstream.

17. The exhaust aftertreatment system of claim 1, wherein the plasma reactor is controlled to achieve a ratio of nitric oxide to nitrogen dioxide (NO:NO2) that is less than 0.5 to desulfate sulfur stored on the selective catalytic reactor device.

18. The method of claim 10, wherein desulfating sulfur stored on the selective catalytic reactor device by reacting with the nitrogen dioxide and nitric oxide at the ratio that is greater than 1:1 comprises controlling the plasma reactor to achieve a ratio of nitric oxide to nitrogen dioxide (NO:NO2) that is less than 0.5 to desulfate sulfur stored on the selective catalytic reactor device.

19. The method of claim 14, wherein desulfating sulfur stored on the selective catalytic reactor device by reacting with the nitrogen dioxide and nitric oxide at the ratio that is greater than 1:1 comprises controlling the plasma reactor to achieve a ratio of nitric oxide to nitrogen dioxide (NO:NO2) that is less than 0.5 to desulfate sulfur stored on the selective catalytic reactor device.

* * * * *